United States Patent [19]
Murayama et al.

[11] Patent Number: 5,617,424
[45] Date of Patent: Apr. 1, 1997

[54] METHOD OF COMMUNICATION BETWEEN NETWORK COMPUTERS BY DIVIDING PACKET DATA INTO PARTS FOR TRANSFER TO RESPECTIVE REGIONS

[75] Inventors: Hideki Murayama, Kunitachi; Satoshi Yoshizawa, Kawasaki; Hidenori Inouchi, Tokorozawa; Takeshi Aimoto; Takehisa Hayashi, both of Sagamihara; Hiroshi Iwamoto, Hadano, all of Japan

[73] Assignee: Hitachi, Ltd., Tokyo, Japan

[21] Appl. No.: 642,666

[22] Filed: May 3, 1996

Related U.S. Application Data

[63] Continuation of Ser. No. 297,220, Aug. 29, 1994, abandoned.

[30] Foreign Application Priority Data

Sep. 8, 1993 [JP] Japan .................................. 5-223550

[51] Int. Cl.⁶ ............................................. H04J 3/24
[52] U.S. Cl. ................................. 370/389; 395/200.01
[58] Field of Search .......................... 370/16, 56, 60, 370/85.13, 94.1, 94.2, 95.2, 99; 395/200.01

[56] References Cited

U.S. PATENT DOCUMENTS

| | | | |
|---|---|---|---|
| 4,654,654 | 3/1987 | Butler et al. | 340/825.5 |
| 5,164,938 | 11/1992 | Jurkevich et al. | 370/94.2 |
| 5,210,749 | 5/1993 | Firoozmand | 370/85.1 |
| 5,337,309 | 8/1994 | Faulk, Jr. | 370/60 |
| 5,347,514 | 9/1994 | Davis et al. | 370/60 |
| 5,365,519 | 11/1994 | Kozaki et al. | 370/60 |
| 5,371,868 | 12/1994 | Koning et al. | 370/60 |
| 5,379,295 | 1/1995 | Yonehara | 370/94.1 |

FOREIGN PATENT DOCUMENTS

| | | | |
|---|---|---|---|
| 2123199 | 5/1993 | Canada | H04L 29/06 |
| 3-29048 | 2/1991 | Japan | G06F 15/16 |
| 4-18652 | 1/1992 | Japan | G06F 13/00 |

OTHER PUBLICATIONS

J. Gait, "A Kernal for High–Performance Multicast Communications," IEEE Transactions on Computers, vol. 38, No. 2, Feb. 1989.

"The Effect of Message Communication on Performance in a Distributed–Memory Parallel Computing System—Communication, Computing Overlap and the Effectiveness of Direct Message Reception," The Parallel Processing Symposium JSPP '93, May, 1993.

"VAX Clusters: A Closely–Coupled Distributed System," ACM Transaction on Computer Systems, vol. 4, No. 2, May 1986, pp. 130–146.

Digital Technical Journal, VAX Cluster Systems, No. 5, Sep. 1987.

Digital Technical Journal, Availability in VAX Cluster Systems, Network Performance and Adapters, vol. 3, No. 3, Summer 1991.

"Hamlyn—An Interface for Sender–Based Communications," Hewlett–Packard Laboratories Operating Systems Research Department, 30 Nov., 1992.

Primary Examiner—Douglas W. Olms
Assistant Examiner—Shick Hom
Attorney, Agent, or Firm—Fay, Sharpe, Beall, Fagan, Minnich & McKee

[57] ABSTRACT

The present invention relates to a network communication method and a network system that enables received data to be transferred directly to the user data region, thereby eliminating the need to perform data copy operations. In the present invention, packets are each provided with received region assignment information (port ID) for showing the region in which the packet is to be received and/or division information for dividing the packet. The region which is to receive data contained in the packet is determined from a port table and conversion tables, and the packet data is transferred to the region directly.

10 Claims, 11 Drawing Sheets

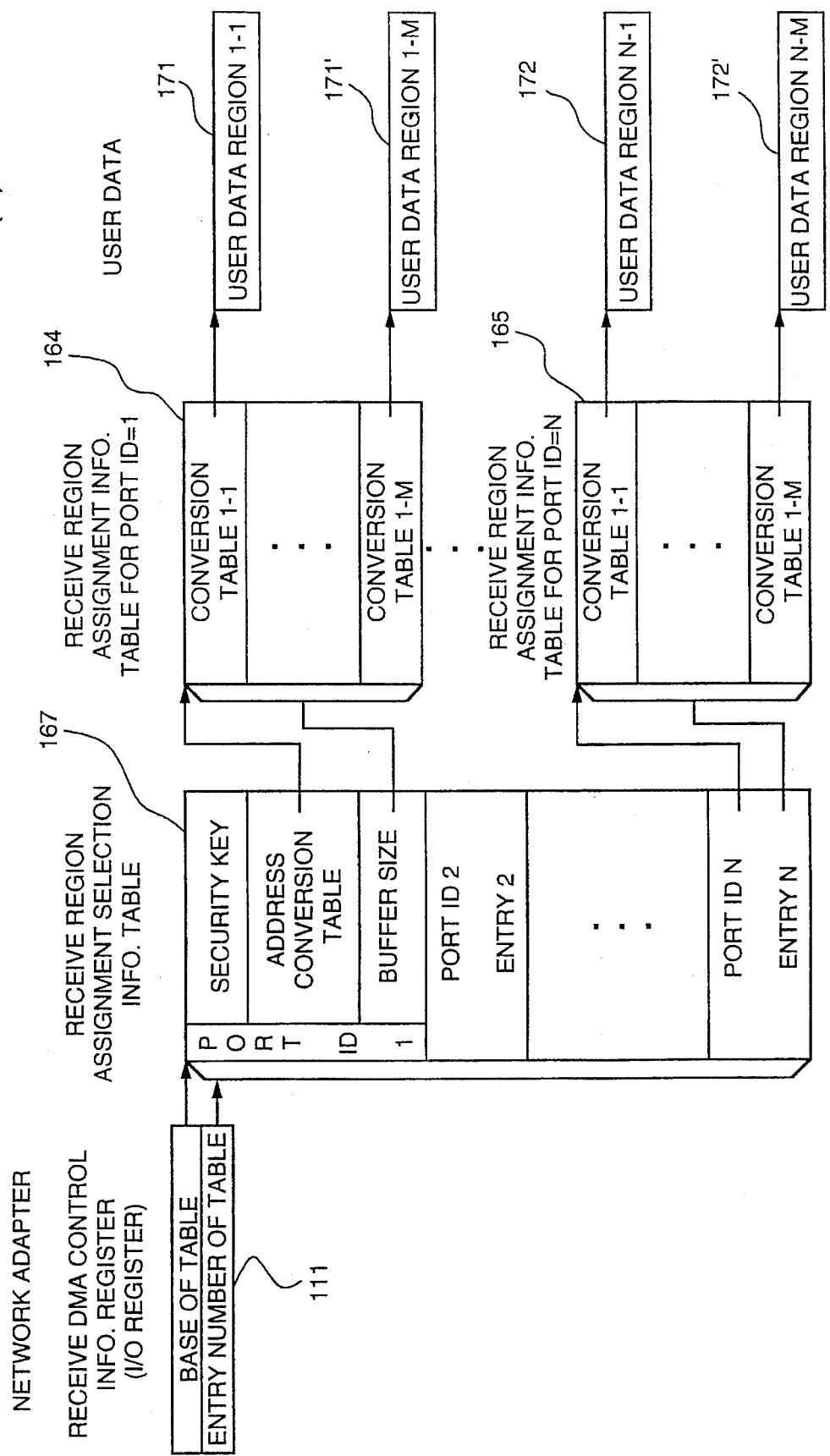

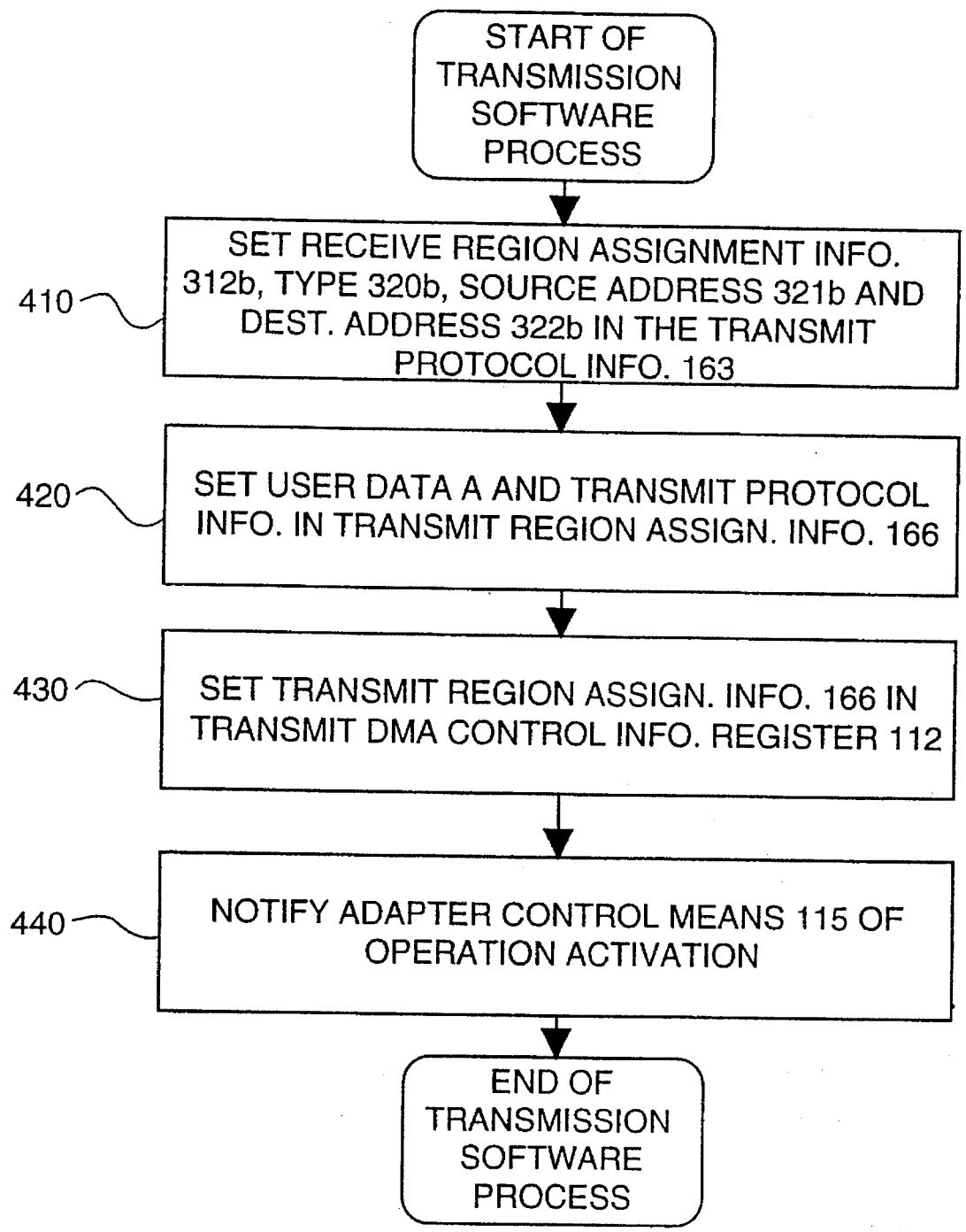

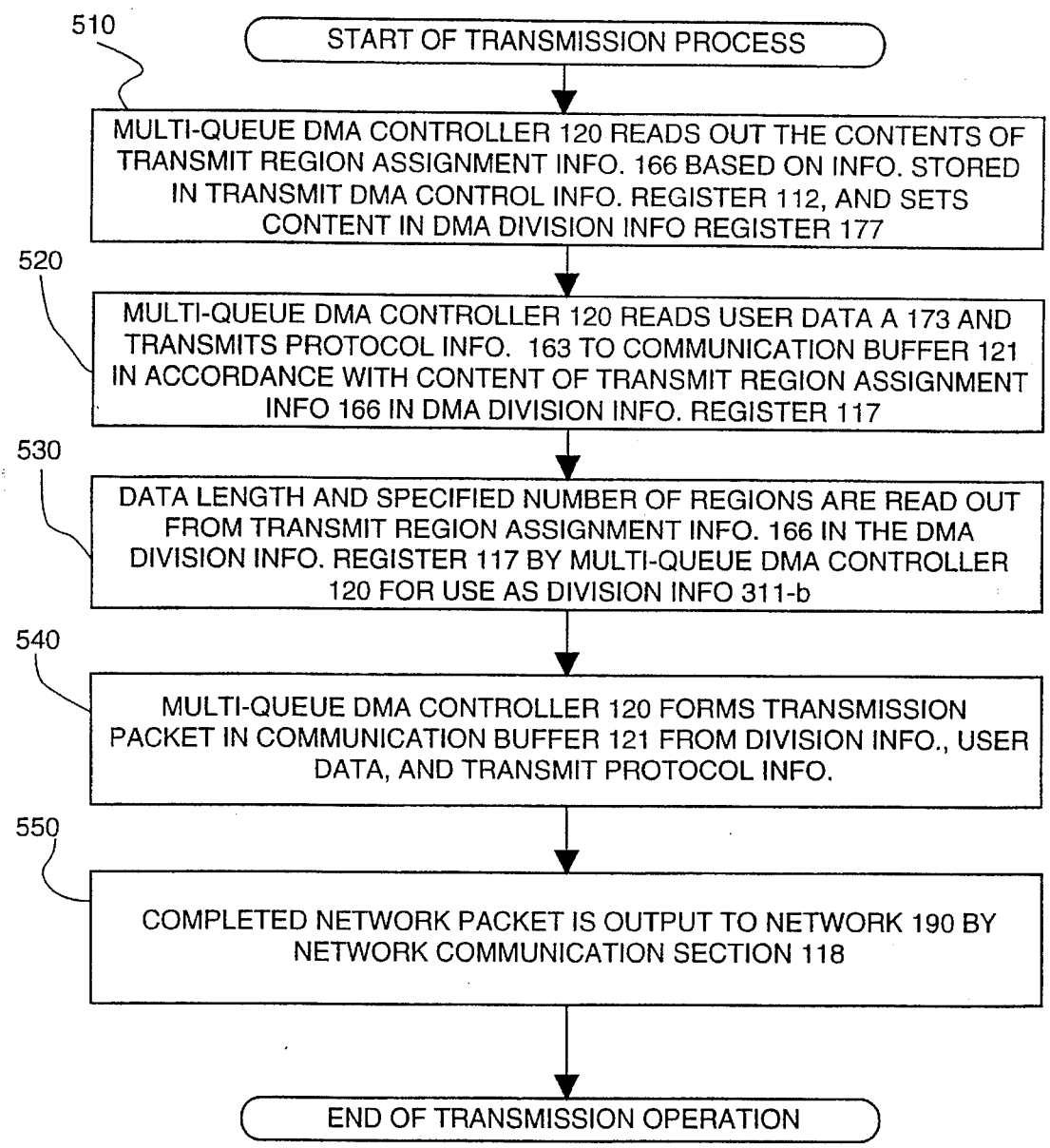

METHOD OF COMMUNICATION BETWEEN NETWORK COMPUTERS BY DIVIDING PACKET DATA INTO PARTS FOR TRANSFER TO RESPECTIVE REGIONS

This is a continuation application of Ser. No. 08/297,220, filed Aug. 29, 1994 and now abandoned.

FIELD OF THE INVENTION

This invention relates to a technique for improving the information communication performance of a network consisting of interconnected information processing systems such as computer systems and the like.

This invention particularly relates to a technique for high speed information communication processing in a network of interconnected computer systems or other such information processing systems equipped with virtual memory.

BACKGROUND OF THE INVENTION

Accompanying the widespread use of local area networks in recent years, a distributed system has now been widely used to concurrently execute on a plurality of machines the processing that could not be done with a single WS (work station). Owing to the advent of a high-speed network medium such as optical fibers and the like, the latency throughput in the network layer has improved strikingly. It is therefore becoming possible to adapt the decentralized processing even for the processings which, so far, could not be done with this system.

A multi-computer system is the one in which a plurality of network computers are linked together through a network and which executes the processing concurrently. Network computers carry out parallel processing while transferring messages via the network. In a multi-computer system, resources are decentralized to prevent the occurrence of bottlenecks that results from the concentration of the resources. Since the resources are decentralized in the multi-computer system, message communication takes place frequently, as required, to exchange resources between computers. In order to improve the system throughput, therefore, it is important to reduce the software overhead in the message communication.

A major portion of the overhead in the communication software processing is the data copy processing. The reasons for requesting the data copy processing may differ depending upon the transmitting side and the receiving side. Shown below are the factors for requesting data copy depending upon the transmitting side and the receiving side.

Copies are needed on the transmitting side because of the following reasons.

(1) The data to be transmitted must exist in a region where main memory exists at all times.

(2) Asynchronous operation must be carried out by which the processing is executed without being blocked.

In the case of the item (1), the user data cannot be transferred by DMA (direct-memory access, a procedure for gaining direct access to memory for data input/output (I/O) processes) processing unless the data exists in the main memory when the transmission operation is carried out by the network adapter. In order to guarantee that the data to be transmitted exists in the main memory at all times, it becomes necessary to copy the data from a user data space that may be paged out into the OS (operating system) space region where the main memory exists at all times and where page-out does not occur.

To carry out the asynchronous operation according to item (2) above, the user data region must be protected so that the data copy is not eliminated.

Furthermore, copies are needed on the receiving side because of the following reasons.

(1) The data-receiving region must exist in the main memory at all times.

(2) The received address is notified by a receive system call.

In the case of the item (1), the user data cannot be transferred by the DMA processing unless the data region exists in the OS space region where the main memory exists at all times when the transmission operation is carried out by the network adapter. The item (2) stems from the fact that the destination of transfer (the received address) is unstable or undetermined when the received data arrives since there is no guarantee that the receive system call is issued earlier than the arrival of the data.

Concerning studies on high speed communication mechanisms, at the Parallel Processing Symposium JSPP '93, held in May, 1993, a paper that was presented on "The Effect of Message Communication on Performance in a Distributed-Memory Parallel Computing System—Communication, Computing Overlap and the Effectiveness of Direct Message Reception" proposes a direct message communication means. Although this paper describes that a receive address could be added to the message header, it does not show how to prevent or obviate the data copy processing.

In order to directly specify the address on the receiving side, the address on the receiving side must be known beforehand on the transmission side. To achieve this, a prior, separate, prescribed notification is required. If this prior communication is effected using a conventional method, it is impossible to reduce the communication processing overhead.

That is, the received address of the user data to which the received data is to be passed, cannot be specified until the hardware based transfer of the received data to the main memory is completed.

As such, incoming received data has to first be moved into the OS space region where the main memory exists at all times before the data is copied or otherwise processed to pass the data to the destination application.

The amount of processing involved in copying this data increases in proportion to the amount of data. At present, such data copying operations account for a large proportion of data-transport operations and this has become a major problem with respect to implementing high speed data communication.

SUMMARY OF THE INVENTION

An object of the present invention is to provide a network data communication system that enables received data to be transferred directly to the user data region, thereby eliminating the need to perform data copy operations.

A further object of the present invention is to provide an economical network data communication system that enables a set of data extending over a plurality of received packets to be received in a single, continuous region by transferring the received packets into the region divided into two or more parts.

As in the case of existing communication operations (such as TCP/IP, a well known communications protocol), the present invention sets a virtual circuit identifier (port ID)

that is used by the receive side and transmit side. On the transmission side, the identifier (port ID) is set for a transmission, and on the receiving side an address is set in a receive region corresponding to the identifier and converted to a hardware receive region address based on the identifier, which is followed by the transfer of the data, so that data is sent directly to a desired region without unnecessary communication processing.

In the present invention, packets are each provided with receive region assignment information (port ID) for showing the region in which the packet is to be received and/or division information for dividing the packet.

The information processing system making up the receiving side of the network refers to a port table and to conversion tables that the receiving side system is provided with beforehand to specify the receive region in the main memory corresponding to the receive region assignment information (port ID). The information processing system divides a received packet in accordance with the packet's division information, if necessary.

The region which is to receive data contained in the packet is determined from the port table and the conversion tables, and DMA is used to transfer the packet data to the region thus determined.

Thus, this invention provides a low-cost manner in which high speed network communication of data between application processes can be realized that does not involve data copying operations by the processor on the receiving side.

BRIEF DESCRIPTION OF THE DRAWINGS

FIG. 1(a) is a block diagram of a dynamic link allocation (DLA) system.

FIG. 4 is a flow chart of transmission software process operations.

FIG. 5 is a flow chart of the transmission operation of the network adapter.

DETAILED DESCRIPTION OF THE PREFERRED EMBODIMENTS

Figure 1B:
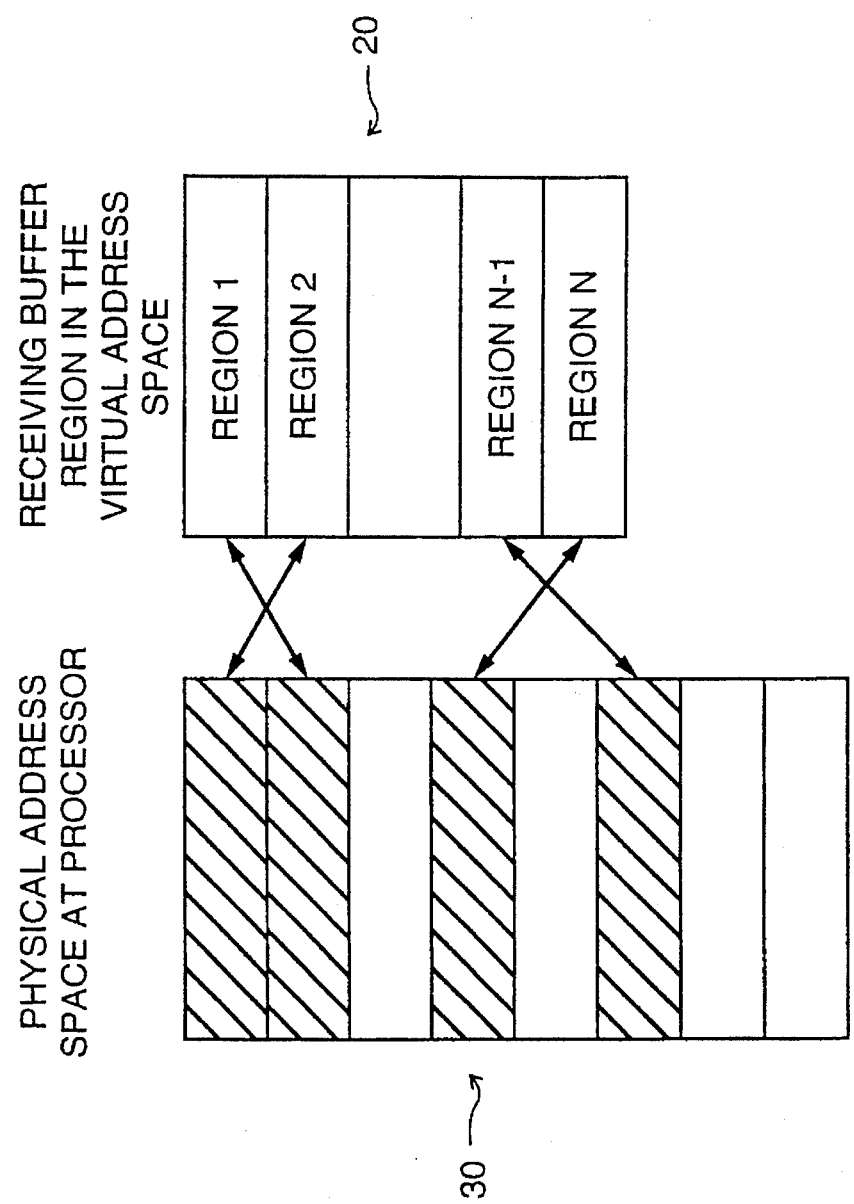
FIG. 1(b) is a block diagram of correspondence between the data region and physical address.

The basic concepts of the present invention will be disclosed prior to a detailed discussion of the embodiments.

One of the reasons for requiring data copy operations in the prior art is that an asynchronous operation must be carried out by which the processing is executed without being blocked on the transmitting side.

To carry out the asynchronous operation in the prior art, the data region must be protected and the data copy cannot be eliminated. To establish the data copy-less technology, therefore, a synchronous operation must be carried out. To realize the synchronous operation without changing the current API (Application Programming Interface), therefore, a synchronous blocking type process which suspends the end of the send system call until completion of the data transfer is employed. A probability remains, however, that the parallel operation might be sacrificed by the synchronous blocking-type process. Provided below, therefore, is the employment of a novel API of the synchronous non-blocking-type which carries out the synchronous operation but which does not cause the process to be blocked. Features of a synchronous blocking-type process and of the synchronous non-blocking-type process are shown in Table 1 below.

TABLE 1

Features of the Synchronous Blocking Type API and the Synchronous Non-Blocking Type API.

| Item | Synchronous blocking type | Synchronous non-blocking type |
|---|---|---|
| Operation | Send system call returns only after the completion of data transfer. | Send system call returns without waiting for the end of data transfer. |
| Feature | No data copy processing is required. API does not need to be changed. | No data copy processing is required. Asynchronous operation of application is possible. |
| Comment | Asynchronous operation of application is impossible. | Novel API is necessary. After the system call confirms the end of transmission is successful, the send take region can be reused. |

To solve the needs for which data copy operations are required on the receiving side, the below-mentioned API must also be changed. The changes are to: (1) Add API (pre-assignment of receiving region) to inform the communication software of the address of the receiving region prior to the arrival of the data, and (2) Render the receiving region to be the region where the main memory exists at all times while the pre-assignment of the receiving region is being processed.

Owing to the addition of the above-mentioned API, the basic operation of the receiving processing becomes as described below.

(1) Connection is established.

(2) Receiving region is pre-assigned.

(3) Receive system call is issued.

(4) Receiving region is opened in preparation for the next reception.

(5) Hereinafter, repeat (3) and (4).

The item (2) must be done prior to the arrival of the data and should preferably be done in the processing (1). Addition of the above-mentioned API makes it possible to realize the data copy-less reception processing. The API can be modified in a variety of ways.

Described below are the requirements for the additional hardware that carries out the data copy-less communication system when the software operates satisfying the above-mentioned basic requirements of the API. To carry out the copy-less communication, it is essential to provide a hardware de-multiplex function for DMA-transferring the data into the main memory in accordance with data that specifies the data region on the receiving side of the packet. In practice, however, the following problems must be solved as well when it is attempted to realize a virtual storage machine having a multi-programming environment.

(1) Bugs in the process must not damage the other processes (protection).

(2) Data must be transferred to a region of contiguous virtual addresses (contiguity of physical addresses is not guaranteed).

Referring to the item (1), the data from the network is directly transferred to the receiving region of the user owing to the data copy-less technique. Without the protection function, however, contents in a different user region or a system region may be destroyed due to an incorrect setting on the transmitting side. It is therefore necessary to provide a mechanism for hardware security checking.

Referring to the item (2), the virtual storage machine manages the main memory region with a page as a unit. Therefore, what is guaranteed is that the receiving region requested by the user is a continuous region in the virtual address space. In the physical address space where the main memory exists at all times, therefore, the continuous region is divided into pages. Shown below is a system for supporting the copy-less communication having a protection function and a function for transferring the data into physically non-continuous regions.

A DLA (dynamic link allocation) system is used as the hardware addition for solving the above-mentioned problems. The DLA system has the following features.

(1) In order to eliminate the data copy processing, packets are directly transferred to the region of the receiving processor.

(2) A security key is checked using the hardware that realizes the protection among the processes.

(3) A receive region assignment selection information table (port table) and receive region assignment information table (address conversion table) are provided for the main memory to loosen the limitations on the security key and on the number of the ports.

(4) Buffer memory for receiving data is managed on the receiving side (to maintain independence).

Mentioned below are the constitution of the DLA system and the control operation thereof. In FIG. 1(a) illustrates the hardware constitution of the DLA system as well as the operation thereof in brief.

(1) Initialize the elements of the receive region assignment selection information table (port table) (167) and the receive region assignment information table (address conversion table) (164 to 165) at the time of pre-assigning the receiving buffer, and render the user data region of the corresponding port to be a region where the main memory exists at all times.

(2) The transmitting side transmits a packet to which are added information (port ID) for assigning the receiving region and a security key for protection.

(3) The receive DMA control information register 111 in the network adapter on the receiving side takes out a corresponding entry from the receive region assignment selection information table (port table) (167) according to the port ID.

(4) Protection is checked by comparing the security key added to the packet with a security key of the content taken out in (3) above.

(5) When the protection checking is successful, determine a physical address on the receiving side according to the receive region assignment information table (address conversion table) (164 to 165), and transfer data directly to the user data region of the receiving side by the DMA processing.

Described below in detail are the protection mechanism and the mechanism for transferring data to the virtual address.

The protection is accomplished by the following processing.

(1) Determine a key that designates the access right to the communication region in the transmitting and receiving of the data.

(2) The transmitting side transfers a packet by adding the key thereto.

(3) The receiving side checks the key in the packet that has arrived and the key in the communication region.

When there is provided no additional hardware, the above-mentioned processings are carried out by interrupt processing, which is against the object of reducing the software overhead. Therefore, an appropriate hardware mechanism is added to check the protection.

In a system having virtual memory management, it is not guaranteed that a continuous region in the virtual address space is a continuous region in the physical address space. FIG. 1(b) illustrates the correspondence between a continuous region in the virtual address and physical address space of the processor.

As shown in FIG. 1(b), the receiving buffer region 20 is a continuous region in the virtual address space but is a non-continuous region in the physical address space 30 of the processor. To transfer the data to the region that is non-continuous in the physical address space, it is necessary to provide an address converter for converting the position in the receiving buffer into physical address space of the processor. Therefore, provision is made for a mechanism that converts a virtual address into a physical address at the moment of obtaining the address for transferring the packet that has arrived.

As a result, the data is transferred as described below into a receiving region that is continuous in the virtual address. Prior to transferring the packet to the main memory, a physical address for receiving the data is determined according to the data of the address conversion table. Then, the data is transferred by the DMA processing to the physical address for receiving the data that is determined above. Through the above-mentioned processing, the data is transferred to a data-receiving region that is physically non-continuous (transferred to the region that is continuous in the virtual address).

Next, detailed embodiments of the present invention will now be described with reference to the drawings.

Figure 2:
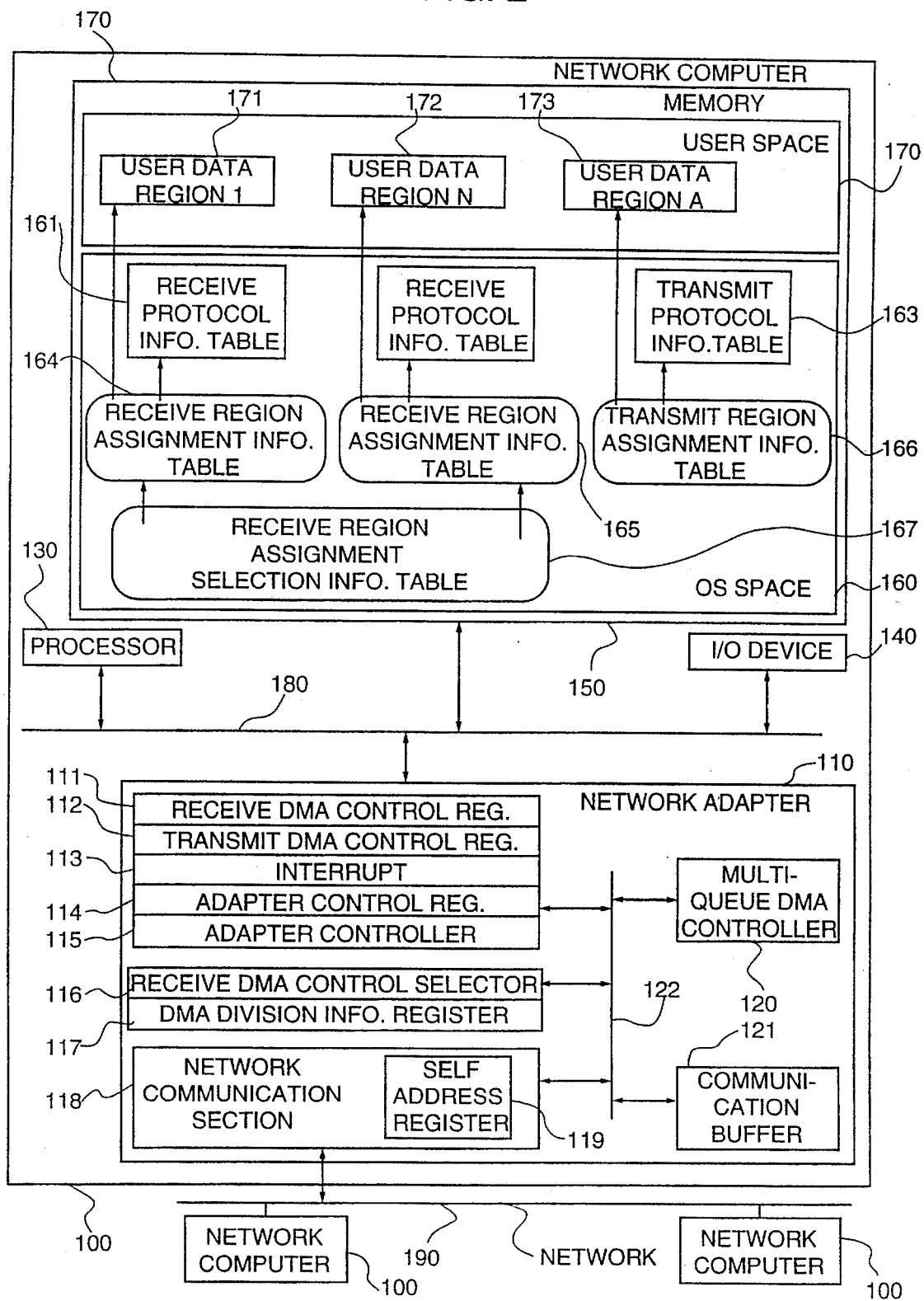
FIG. 2 is a block diagram of a computer network system.

FIG. 2 shows the configuration of a network computer as one example of an information processing system according to this invention, used to form a network. A network 190 is comprised of at least two network computers 100. Each network computer 100 is comprised of a processor 130, a main memory 150, and a network adapter 110, with each of these constituent elements being connected to a system bus 180. Preferably a network computer 100 system configuration will be provided with one or more I/O devices 140.

The network adapter 110 is provided with a multi-queue DMA controller 120, communication buffer (transmitting and receiving buffer) 121, network communication section 118, receive DMA control information register (I/O register) 111, transmit DMA control information register 112, interrupt control information register 113, adapter control information register 114, adapter controller 115, receive DMA control information selector 116, and DMA division information register 117, which are all connected together by means of an internal bus 122.

The multi-queue DMA controller 120 controls data transfers from the communication buffer 121 to the main memory 150 (during receiving operations) based on information held in the receive DMA control information register (I/O register) 111, adapter control information register 114 and receive DMA control information selector 116, information contained in packets received from the network, and information held in receive region assignment selection information table (port table) 167 and the receive region assignment information tables (address conversion tables) 164 and 165 in the main memory 150. The data transfers from the main memory 150 to the communication buffer 121 (during transmission operations) based on information held in the transmit DMA control information register 112, the interrupt control information register 113 and the adapter control information register 114, and information held in the region assignment information table 166 in the main memory 150, and may be formed using electronic devices such as various types of TTL and CMOS devices, for example.

The receive DMA control information register (I/O register) 111 is for holding control related information for when data is transferred from the communication buffer 121 to the main memory 150. The transmit DMA control information register 112 is for holding control related information for when data is transferred from the main memory 150 to the communication buffer 121. The interrupt control information register 113 is for holding information used for executing an interrupt such as at the completion of data transfer between the communication buffer 121 and the main memory 150 or upon the completion of other prescribed operations. The adapter control information register 114 is for holding various types of control information used during operations of the network adapter 110. The adapter control means 115 is the means whereby the processor 130 provides the network adapter 110 with control information for controlling packet data transfers by DMA. The receive DMA control information selector 116 is for temporarily holding receive region assignment information (port ID) 312-b in a packet, in order to select the receive region assignment information tables (address conversion tables) (164 to 165). The DMA division information register 117 is for temporarily holding the data length and specified number of regions stored in the transmit region assignment information table 166. The network communication section 118, which includes a self address register 119, transmits the contents of communication buffer 121 out onto the network 190, monitors packets on the network 190 and places packets that include its own address into the communication buffer 121. Each of these devices may be formed using electronic devices such as various types of TTL and CMOS devices, for example.

The communication buffer 121 is for holding packets for transmission over the network 190 and packets received via the network 190, also may be formed of electronic devices such as RAM devices, for example. A central processing unit (CPU) may be used as the processor 130, and the main memory 150 may be formed of RAM, for example.

The structure of data stored in the main memory 150 involves a consideration of the structure of data related to receive operations and the structure of data related to transmit operations. Related to receive operations, there are a receive region assignment selection information table (port table) 167, receive region assignment information tables (address conversion tables) 164 and 165, receive protocol information tables 161 and 162, and user data regions 171 and 172. User data regions 171 and 172 are stored by the receiving side for the receipt of data. Receive protocol information tables 161, 162 are stored in regions for the transfer of protocol information required during communication. Protocol information required during communication is for example information for specifying receive procedures. Information of the receive region assignment information tables (address conversion tables) 164, 165 includes control information used in transferring (incoming) packets, such as for example address information of the user data regions 171, 172 and the receive protocol information tables 161, 162. Information pointing to a plurality of user data also may be maintained by receive region assignment information tables (address conversion tables) 164, 165.

With respect to FIG. 2, the receive region assignment selection information table (port table) 167 in the main memory 150 is for selecting which receive region assignment information tables (address conversion tables) 164, 165 are to be selected based on an indication by the network packet receive region assignment information (port ID) 312-b, described below. This data is in table form.

Related to transmit operations, there are transmit region assignment information table 166, transmit protocol information table 163 and a user data region. User data region 173 is stored in a region by the transmitting side for transmission. Transmit protocol information table 163 is stored in a region for the transfer of protocol information required during communication. Examples of protocol information required during communication include information specifying destination procedures.

Information of the transmit region assignment information table 166 is control information needed when transferring (outgoing) packets, such as for example user data region 173, transmit protocol information table 163 address information and size information. Information pointing to a plurality of user data also may be maintained by transmit region assignment information table 166.

Receive region assignment information tables (address conversion tables) 164, 165 specify the transfer destination region for receive protocol information tables 161, 162 and user data regions 171, 172, and contain for example addresses in the main memory 150, data size and so forth.

Transmit region assignment information table 166 specifies transmit protocol information table 163 and user data region 173, and contains for example addresses in the main memory 150, data size and so forth. As in the case of receive operations, a plurality of transmit protocol information tables 163 and user data regions 173 may be provided.

In this embodiment, user data regions 171, 172 and user data region 173 reside in user space region 170 within the main memory 150. Receive region assignment selection information table (port table) 167, receive protocol information tables 161, 162, receive region assignment information tables (address conversion tables) 164, 165, transmit region assignment information table 166 and transmit protocol information table 163 reside in OS space region 160.

Figure 3A:
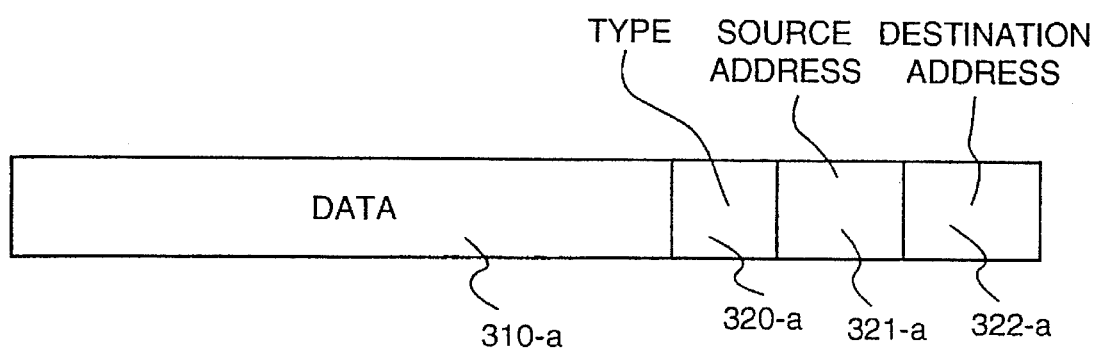
FIG. 3(a) is a diagram of a prior art data packet.
Figure 3B:
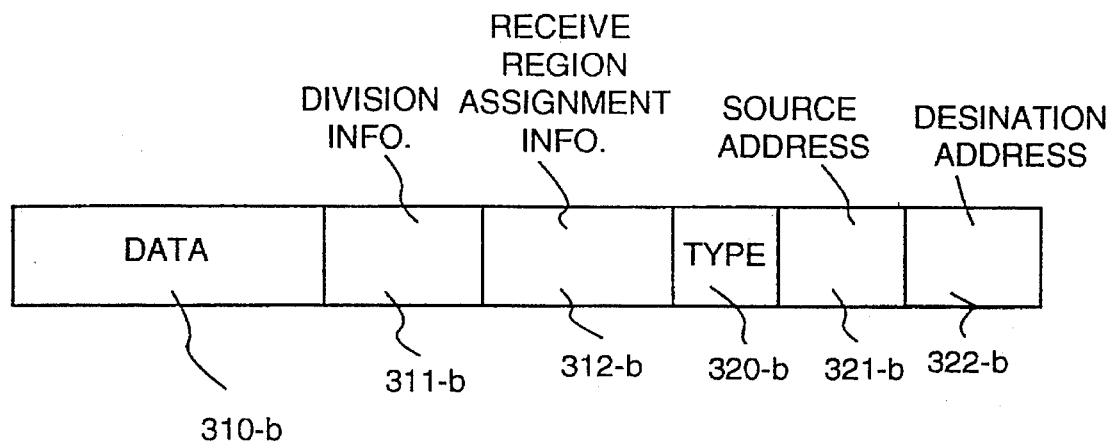
FIG. 3(b) is a diagram of a data packet that is transmitted according to the present invention.

FIG. 3(a) and FIG. 3(b) show the composition of a network communication packet.

A conventional network packet is shown in FIG. 3(a) and is comprised, for example, of data 310-a, type information 320-a, source address 321-a and destination address 322-a. Data 310-a is information that is processed by the OS and other software. Type 320-a is data length or other such information required for the network adapter 110 to perform its prescribed processing. Source address 321-a is the identifier of the network computer that sent the packet. Destination address 322-a is the identifier of the receiving network computer.

As shown in FIG. 3(b), a network packet according to the present invention comprises data 310-b, division information 311-b, receive region assignment information 312-b, type information 320-b, source address 321-b and destination address 322-b. Data 310-b, type 320-b, source address 321-b and destination address 322-b correspond to data 310-a, type information 320-a, source address 321-a and destination address 322-a.

On the receiving side, data 310-b consists of information corresponding to receive protocol information tables 161, 162 without receive region assignment information 312-b, type information 320-b, source address 321-b and destination address 322-b, and user data 171, 172.

On the transmitting side, data 310-b consists of information corresponding to transmit protocol information table 163 without receive region assignment information 312-b, type information 320-b, source address 321-b and destination address 322-b, and user data 173.

Division information 311-b shows the number of packet divisions and the lengths of divided portions. It is to be understood that this division information may include information for three or more divisions. It may also include information that, when the packet is divided, shows which of the divided portions corresponds to receive protocol information tables 161, 162 and transmit protocol information table 163, and which of the portions corresponds to user data regions 171, 173. When a packet is to divided into three or more parts, it is also preferable to include information that indicates which of the divided portions corresponds to which portion of the user data.

Receive region assignment information 312-b is for selecting the receive region assignment information (port ID) that indicates the destination of data being transferred from a packet to the main memory 150.

Packet transmitting and receiving processes will now be described.

The packet transmission process consists of using user data region A, 173 and transmit protocol information table 163 to form a network packet according to the present invention as shown by FIG. 3(b), and outputting the packet to the network.

Transmission software processing and the operation of the network adapter 110 will now be described.

First, software-based processing carried out at packet transmission time will be described with reference to FIG. 4. User data region A, 173 contains user data to be transmitted. In Step 410, receive region assignment information 312-b, type information 320-b, source address 321-b and destination address 322-b are set in the transmit protocol information 163. As described above, the receive region assignment information 312-b is an identifier (port ID) for identifying the data receive region on the receiving side. As an example, type 320-b can be information indicating a type of upper-level protocol. Source address 321-b is own computer network identifier, and destination address 322-b is the identifier for the network computer on the receiving side. In Step 420, information specifying information of user data region A, 173 and transmit protocol information table 163 is set in transmit region assignment information table 166.

The address, data length and so forth in user data region 170 are examples of information that is set. The information that is set in the transmit region assignment information table 166 includes data length and the specified number of regions. The information of the data length and the specified number of regions is one of elements in the network packet as division information 311-b.

In Step 430, the information of the transmit region assignment information table 166 is set in transmit DMA control information register 112. Information set in transmit DMA control information register 112 includes the address of the regions in user data region 170. In Step 440, an operation activation notification is implemented for adapter control means 115. The above sequence of procedures completes the transmission process.

The operation of the network adapter 110 at transmission time will now be described, with reference to FIG. 5. The description will be made with reference to operations following the start of operation of the adapter control means 115 as a result of the operation activation notice.

In Step 510, the multi-queue DMA controller 120 reads out the content of transmit region assignment information table 166 based on information stored in the transmit DMA control information register 112, and sets this content in the DMA division information register 117.

In Step 520, the multi-queue DMA controller 120 reads information from the user data region A, 173 and transmit protocol information table 163 into the communication buffer 121 in accordance with the content of the transmit region assignment information table 166 in the DMA division information register 117.

In Step 530, the data length and specified number of regions are read out from the transmit region assignment information table 166 in the DMA division information register 117 by the multi-queue DMA controller 120 for use as division information 311-b.

In Step 540, the multi-queue DMA controller 120 forms data 310-b from user data region A, 173 and information other than destination address 322-b, source address 321-b, type 320-b and the receive region assignment information (port ID) 312-b maintained in the transmit protocol information table 163, and prepares and stores in the communication buffer 121 a network packet according to the present invention, using destination address 322-b, source address 321-b, type 320-b and the receive region assignment information (port ID) 312-b maintained in the transmit protocol information table 163. Finally, in Step 550 the completed network packet is output via internal bus 122 by the network communication section 118.

The packet reception procedure will now be described. Using hardware-based processing, the data portions of packets received from the network 190 are directly transferred to a user data storage region within the user space, thereby enabling the data to be passed to an application program without data copy operations. Details of the receiving procedure are explained as follows.

Receiving procedures are broadly divided into software preprocessing, which is software processing performed prior to the arrival of the data, processing by the network adapter 110 at the time of data arrival, and software post-processing, which is software processing performed subsequent to the arrival of the data.

Figure 6:
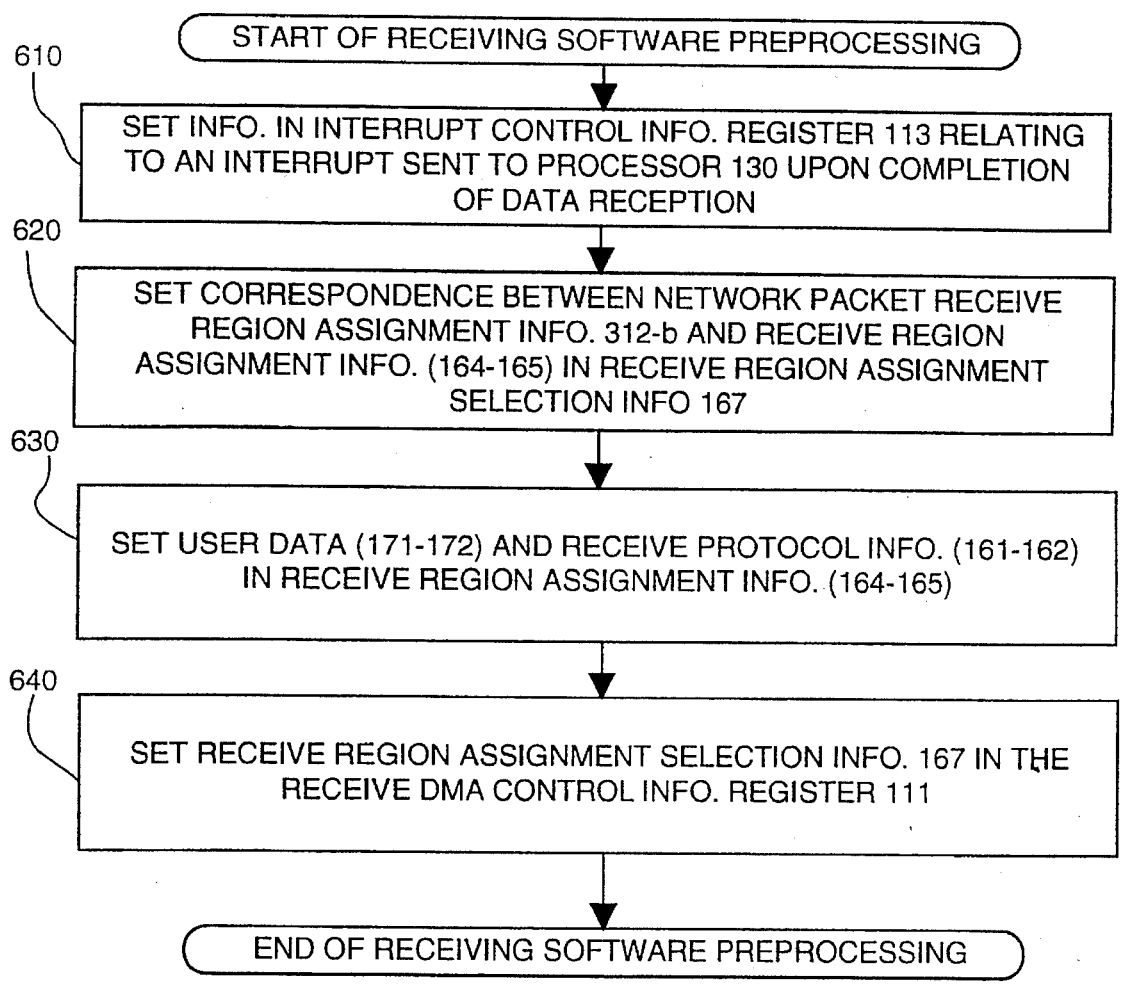
FIG. 6 is a flow chart of receiving software preprocessing.

First, software preprocessing will be described according to FIG. 6. Information is set in the receive region assignment selection information table (port table) 167 and the receive region assignment information tables (address conversion tables) 164, 165, and the network adapter 110 is notified. In Step 610, information is set in the interrupt control information register 113 relating to an interrupt sent to the processor 130 upon completion of data reception. Step 620 involves setting the correspondence between network packet receive region assignment information (port ID) 312-b and the receive region assignment information tables (address conversion tables) (164 to 165) in the receive region assignment selection information table (port table) 167.

The receive region assignment selection information table (port table) 167 is in the form of a data table that enables the receive region assignment information to be read out based on the receive region assignment information (port ID) 312-b. In Step 630, user data regions (171 to 172) and receive protocol information tables (161 to 162) are set in receive region assignment information tables (address conversion tables) (164 to 165). Examples of such information thus set include the addresses of user data regions (171 to 172) and receive protocol information tables (161 to 162) and data size. Finally, in Step 640, the receive region assignment selection information table (port table) 167 is set in the receive DMA control information register (I/O register) 111.

Figure 7:
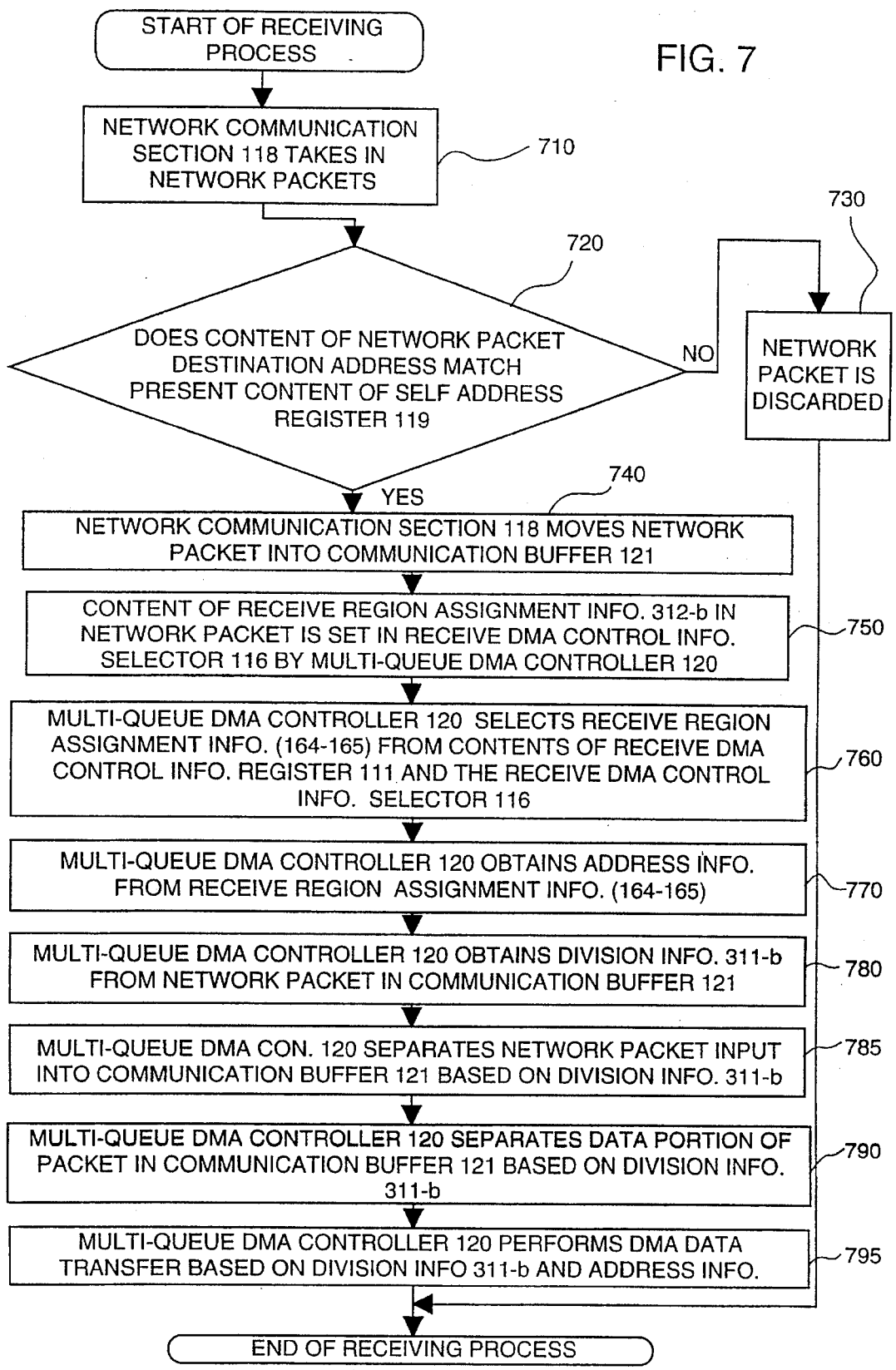
FIG. 7 is a flow chart of the receiving operation of the network adapter.

As shown in FIG. 7, the operation of the network adapter 110 from the inception of a network packet to the reception of the data will now be described. In Step 710, the network communication section 118 in the network adapter 110 monitors the network 190 and takes in network packets communicated over the network 190. Next, in Step 720, when the content of network packet destination address 322-b matches the preset content of the own-address register 119, the process moves to Step 740, while if the contents do not match the process branches to Step 730. In Step 730, the network packet is discarded and the process is terminated. In the case of Step 740, the network packet is moved into the communication buffer 121. In Step 750, the content of the receive region assignment information (port ID) 312-b in the network packet is set in the receive DMA control information selection means 116 by the multi-queue DMA controller 120. In Step 760, the multi-queue DMA controller 120 selects one of the plural sets of receive region assignment information tables (address conversion tables) 164, 165 from the contents of the receive DMA control information register (I/O register) 111 and the receive DMA control information selection means 116.

That is, the process comprises the receive region assignment selection information table (port table) 167 being referred to in accordance with the contents of the receive region assignment information (port ID) 312-b and one of receive region assignment information tables (address conversion tables) 164, 165 being specified accordingly.

In Step 770, the multi-queue DMA controller 120 obtains address information from selected one of receive region assignment information tables (address conversion tables) (164 to 165). In Step 780, the multi-queue DMA controller 120 obtains division information 311-b from the network packet in the communication buffer 121. In Step 785, the multi-queue DMA controller 120 separates the data portion of the packet in the communication buffer 121 based on division information 311-b.

That is, based on the division number and length information contained in the division information, and the information indicating which of the divided portions correspond to the receive protocol information tables (161 to 162) and portions correspond to the user data regions (171 to 172), network packet data 310-b is divided into receive protocol information and user data.

In Step 790, based on the receive region assignment information specified in Step 770 (such as address values in memory 150, for example), the divided packet portions are separated into user data and receive protocol information and transferred to their respective destination regions.

Furthermore, memory access by a program (an ordinary application program) running under virtual memory is accomplished by using information contained in the receive region assignment information tables (address conversion tables) 164, 165 to convert virtual memory addresses to physical address memory addresses. Specifically, the receive region assignment information tables (address conversion tables) 164, 165 show the physical page corresponding to the virtual page of a process.

"Page" is the basic unit of OS memory management. Page sizes are expressed as powers of two; most existing operating systems use pages of 2048, 4096 or 8192 (bytes or the like). Physical and virtual addresses are values obtained by adding a page offset value to the number of the above page. The same page offset value is used for both physical addresses and virtual addresses. When setting a physical address, the address conversion table can be used to obtain the physical address corresponding to a logical address.

To take one example, if an application data region is at logical page (virtual page) "M, M+", and data is received that extends over two such regions, physical pages 200 and 358 are multiplied by the page size, and page offset values are added to the result, thereby obtaining a physical address which only needs to be set in a data pointer of two continuous commands in the command queue. This operation makes it possible to transfer received data from non-continuous physical address regions into a continuous virtual address region. Finally, in Step 795, an interrupt is sent to the processor 130 in accordance with the contents of the interrupt control information register 113.

Figure 8:
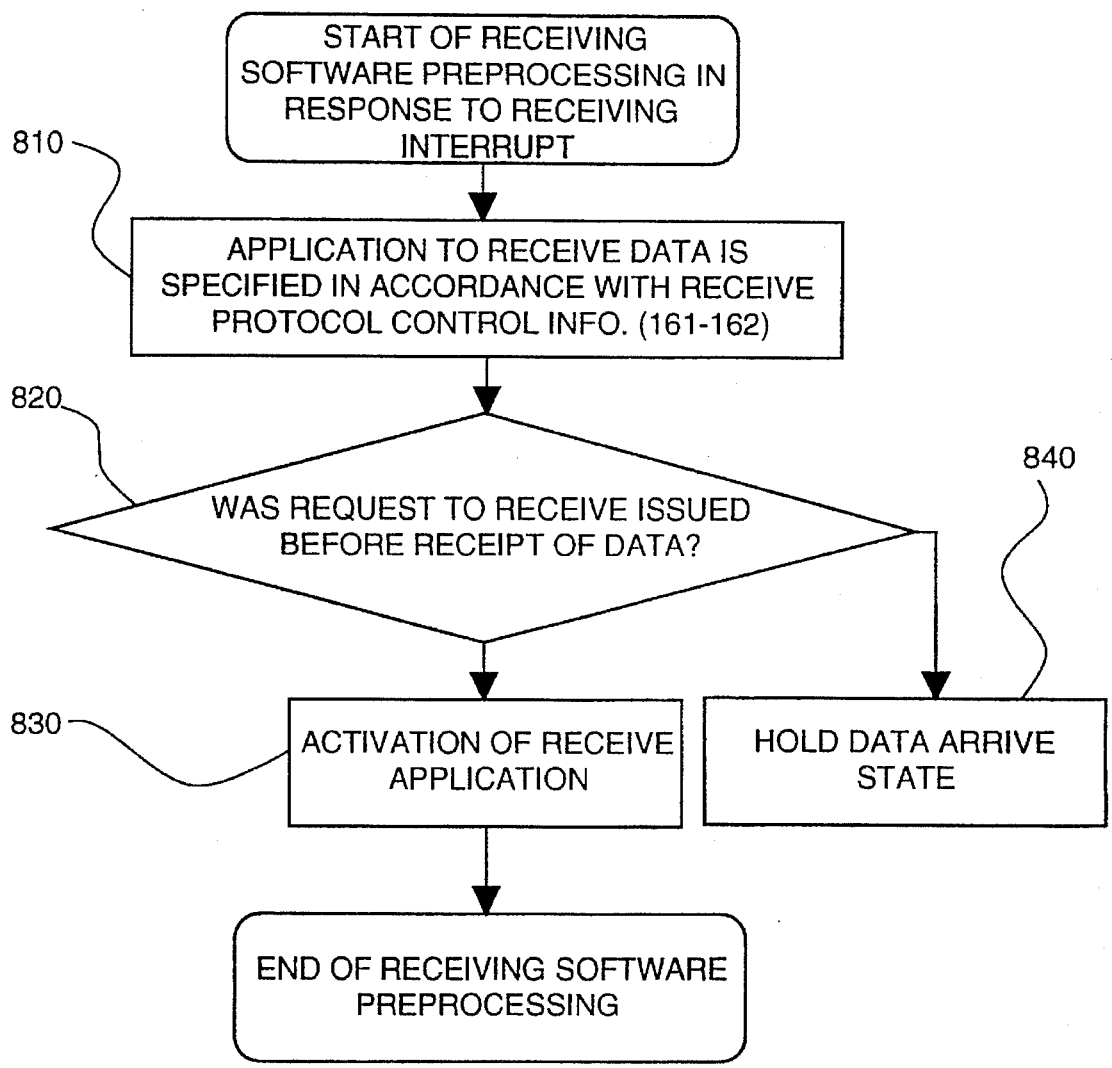
FIG. 8 is a flow chart of receiving software post-processing.

As shown in FIG. 8, the reception software post-processing that takes place following the arrival of data will now be described. Reception software post-processing is activated by the interrupt issued following the division of the network packet into user data and receive protocol information, and the transfer thereof. In Step 810, when an interrupt is issued, the processor 130 specifies the application which receives the data in accordance with receive protocol control information. In Step 820, when the receiving application is in a wait state entered after issuing a request to receive data, the process moves to Step 830, otherwise the process branches to Step 840.

In Step 830, the application that requested the data and is blocked is activated. In Step 840, when the receiving application has been released from a wait state following the issuance of a request to receive data, a flag is set to indicate the state and enable the data to be passed to the application as soon as a request to receive is issued. In such a case, the procedure to pass the data to the application is implemented when the receiving application issues the request to receive.

Figure 9:
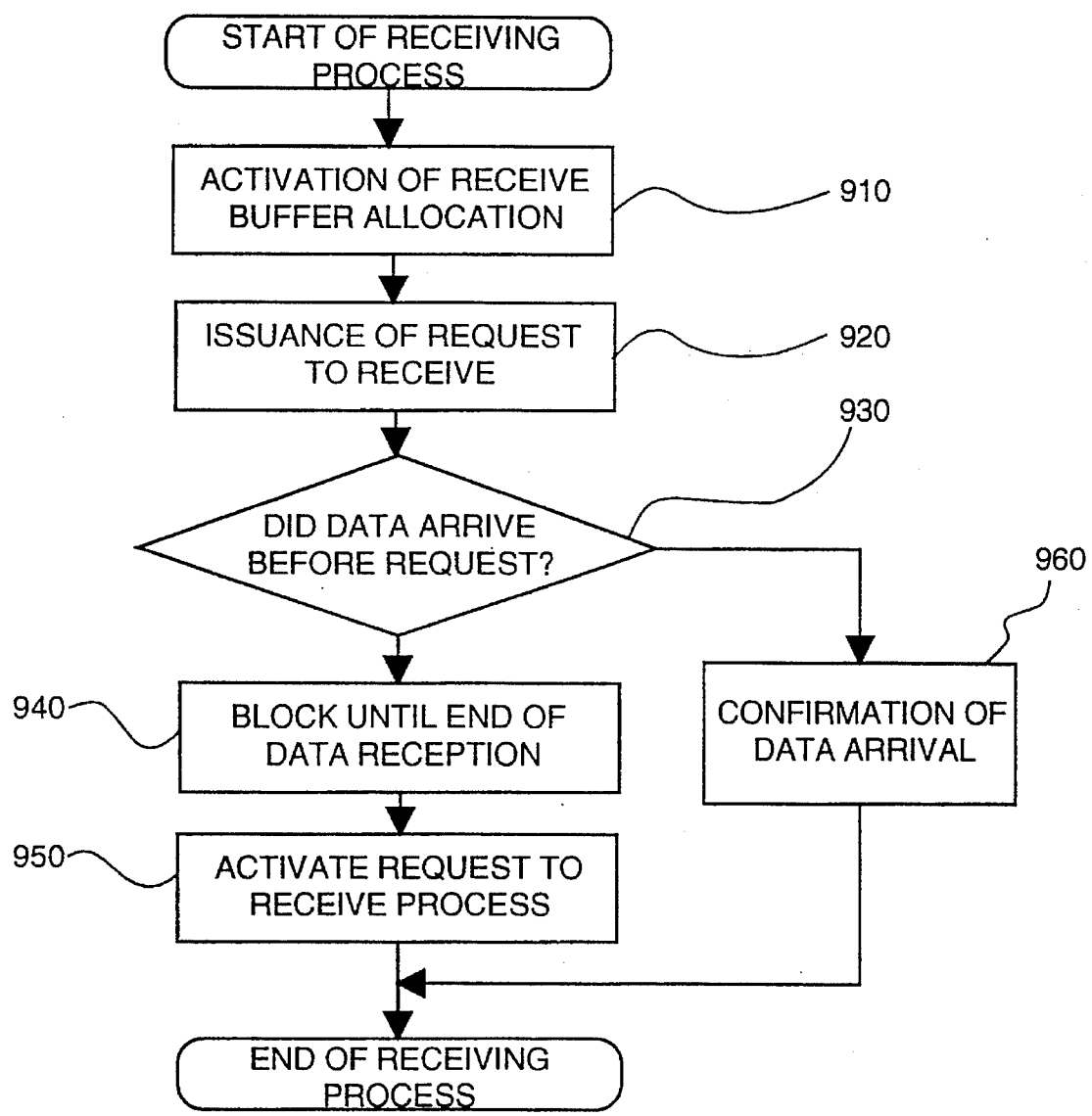
FIG. 9 is a flow chart of the receiving application process.

To clarify the reception processing, the operation is described below, with reference to FIG. 9, from the perspective of an application program that issues a request to receive. Allocation of receive buffer space is performed in Step 910. This activates the process described with reference to FIG. 6. In Step 920, a request to receive is issued. The receive buffer allocation of Step 910 is a necessary precondition to the issuance of a request to receive, but issuing a request to receive immediately following the buffer allocation process is not a required precondition.

While the flow chart is limited to a description of just the reception related process to provide a clear picture of the flow of the receiving procedure, a prescribed procedure may be inserted between Step 910 and Step 920.

In accordance with Step 930, the process branches to Step 960 when the arrival of data precedes a request to receive, while in other cases the process moves to Step 940. In Step 960, the flag signifying data arrival has been set, as described with reference to FIG. 8, so all that has to be done is to just accept the data.

In Step 950, as the data has not yet arrived the process enters a wait state that lasts until the activation of the request to receive process described with reference to FIG. 8. The method described with reference to FIG. 8 is used for the reversion from the wait state.

In accordance with this invention, in the communication of data in packets over a network of a plurality of information processing systems, a low-cost means of communicating information at high speed is provided that does not involve data copying, page table modification and the like by the information processing system on the receiving side.

Furthermore, another embodiment of the present invention will be described.

In the first embodiment, hardware is added (the hardware addition mechanism) for effecting the copy-less communication by the DLA system. The copy-less communication makes the copying processing unnecessary. Next, the software process that should be decreased is the overhead of scheduling. Employment of thread or the like is effective in decreasing the scheduling processing. It is also possible to decrease the number of interrupts by the provision of additional hardware addition mechanism and to reduce the overhead in the scheduling processing. The hardware addition mechanism will now be described.

On the receiving side, there is no need of issuing the interrupt when the data arrives earlier than a receive system call. The interrupt is necessary for starting the process that was blocked by issuing the receive system call earlier than the arrival of the data. If there is no process that is being blocked, therefore, there is no need of issuing an interrupt. That is, issuance of the interrupt is controlled by holding the state which shows the presence of the blocked process.

When the communication is carried out using a large packet to obtain a high throughput, an interrupt generated by other packets is not allowed. Latency is deteriorated because a maximum time for packet transfer is extended. To solve this problem, a hardware addition mechanism can transmit the packet of such a size that it does not increase the latency and issue an interrupt when the final data region has arrived. In a node computer from which it is desired to transmit an emergency packet, the latency is minimized by batch processing.

Further, a last packet interrupt mechanism can be provided as a hardware addition mechanism that manages the state where there exists blocked processes and as a mechanism that issues an interrupt when the last packet of data region has arrived.

Figure 10:
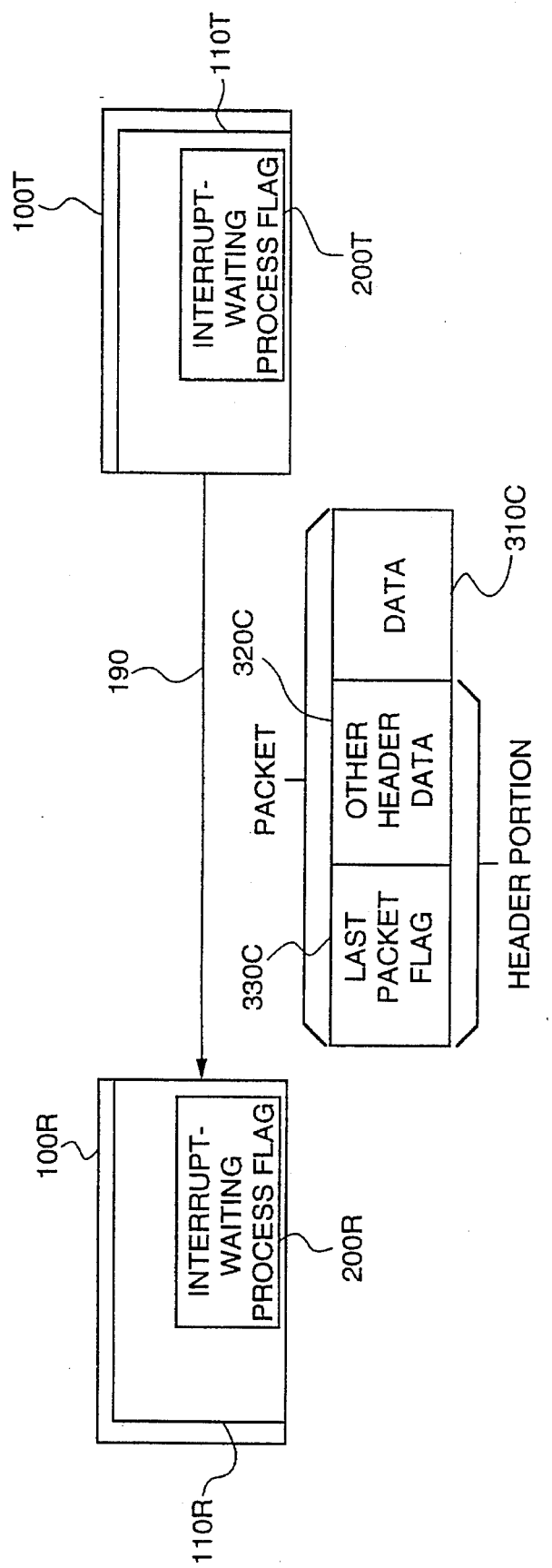
FIG. 10 is a block diagram of a last packet interrupt.

FIG. 10 shows an outline of a system of a last packet interrupt mechanism. 100T is a network computer of the transmitting side, and 100R is a network computer of the receiving side. 110T and 110R are network adapters. 200T and 200R show each of interrupt-waiting process flags. A packet includes data 310-C, other header data 320-C and last packet flag 330-C.

Described below is the outline of the operation of the last packet interrupt mechanism. There is no need of issuing an interrupt when the receive system call of a network computer on the receiving side is not earlier than the arrival of the data.

Mentioned below is the operation performed when the receive system call is preceding and the process is blocked.

(1) The interrupt-waiting process flag of the network adapter is turned on when the receiving process is blocked.

(2) On the transmitting side, the last packet flag is turned on in the last packet.

(3) On the receiving side, issuance of an interrupt is controlled depending upon the AND condition of the state in which the interrupt-waiting process flag of the network adapter is turned on and the state in which the last packet flag is turned on.

According to the above-mentioned operation, while the receiving side is receiving large amounts of data that are divided into a plurality of packets, arrival of an emergency packet from other node can be received in an interrupting manner, making it possible to realize the communication of a high throughput without sacrificing the low latency.

We claim:

1. A network communication method for communicating information between network computers that each include at least a processor, a main memory and a network adapter connected to a network, comprising:

pre-assigning a receiving region in the main memory of a receiving network computer prior to the arrival of a data packet from a transmitting network computer, and initializing a port table and address conversion tables in the main memory of the receiving network computer;

transmitting a packet from said transmitting network computer, including adding a port ID for assigning a receiving region in the receiving network computer;

extracting from the port table in the main memory of the receiving network computer, information on the basis of the port ID; and determining a physical address in the main memory of the receiving network computer on the basis of the information extracted from the port ID table, and transferring data of the transmitted data packet to the main memory of the receiving network computer identified by the physical address.

2. The network communication method according to claim 1, further including adding a security key to the transmitted data packet;

determining a security key information from said extracted information; and comparing the security key added to the transmitted packet with the security key information.

3. The network communication method according to claim 1, further including adding division information to the transmitted data packet that identifies a portion of divisions of the transmitted data packet when the data portion is divided into at least two parts; and transferring each of the divided parts of the data portion to the user data region of the main memory of the receiving network computer based on the division information.

4. The network communication method according to claim 1, wherein address conversion tables are used in said step of determining a physical address to convert a user data region that has continuous virtual address space to a user data region that has non-continuous physical addresses.

5. The network communication method according to claim 1, wherein the receiving network computer issues an interrupt when the final transmitted data packet has been transmitted to the user data region.

6. A network communication method comprising the use of packets each having a header portion and a data portion to communicate information between information processing systems in a network, said network being comprised of at least two information processing systems wherein each of said information processing systems includes at least a processor section, a main memory and a network adapter and wherein each said system is connected to said network by means of the network adapter of each said system, comprising:

transmitting a packet that has first division information for separating the data portion from the header portion and second division information that indicates the position of divisions when the data portion is to be divided into two or more parts in a specified region of the header portion of the packet from a transmitting one of said information processing systems;

separating the header portion and data portion of the received packet based on the first division information in the specified region of the header portion, and dividing the data portion based on the second division information in the specified region of the header portion from the data portion and transferring the divided parts of the data portion to the main memory of a receiving one of said information processing systems.

7. The network communication method according to claim 6, wherein the transmitting information processing system also includes in the specified region of the header portion of the packet that is transmitted, information indicating the transfer destination of each divided portion of data within the receiving information processing system.

8. The network communication method according to claim 7, wherein the information indicating the transfer destination and information indicating the corresponding memory regions in the receiving information processing system are stored, the information indicating the transfer destination read out from the header portion of received packets is used as a basis for referring to information indicating the corresponding memory regions, and the divided data portions are each transferred to said memory regions.

9. The network communication method according to claim 3, wherein the information indicating the transfer destination and information indicating the corresponding memory regions of the receiving information processing system are stored in the form of a data transfer table, and the information indicating the transfer destination is information that indicates a reference location in the data transfer table.

10. A network system comprised of at least two information processing systems that each includes at least a processor, a main memory and a network adapter and which are connected to said network system by means of the network adapter of each said system, in which information is communicated between said information processing systems in packets each having a header portion and a data portion, comprising:

each said information processing system is provided with a transmission processing part that writes first division information for separating the data portion from the header portion and second division information that indicates the position of divisions when the data portion is to be divided into two or more parts in a specified region of the header portion of each packet that is transmitted, and a receiving information processing system that receives packets separates the header portion and data portion of each received packet based on the first division information in the specified region of the header portion, and based on the second division information in the specified region of the header portion divides the data portion and transfers the divided parts of the data portion to a storage section, in which at least the receiving information processing system, and two or more data portions contained in said received packets are transferred to their respective target regions in the main memory.

\* \* \* \* \*